May 22, 1951  R. L. TRAVIS  2,553,731
POWER MOWER

Filed May 8, 1946  2 Sheets-Sheet 1

INVENTOR.
Ralph L. Travis
BY Victor J. Evans & Co.
ATTORNEYS

May 22, 1951 R. L. TRAVIS 2,553,731
POWER MOWER
Filed May 8, 1946 2 Sheets-Sheet 2
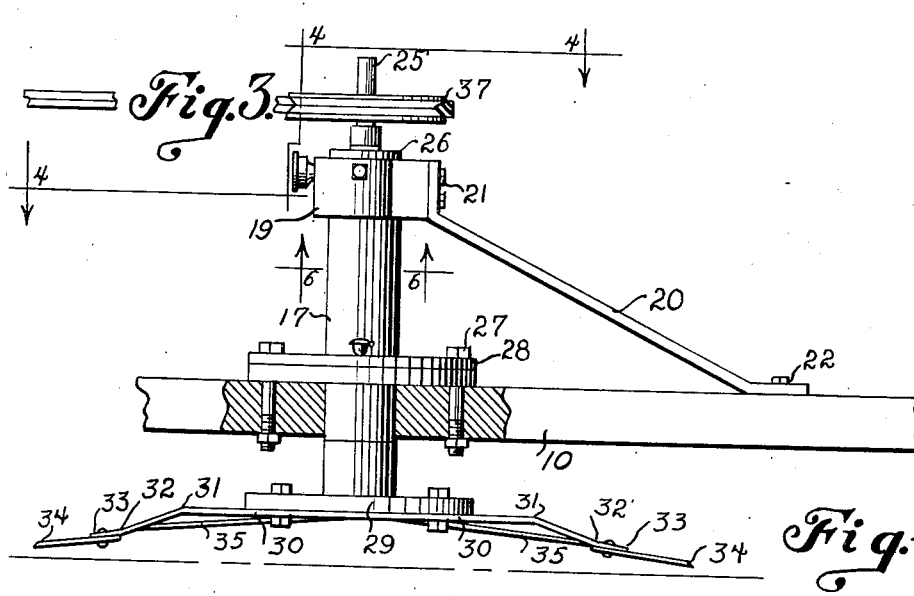
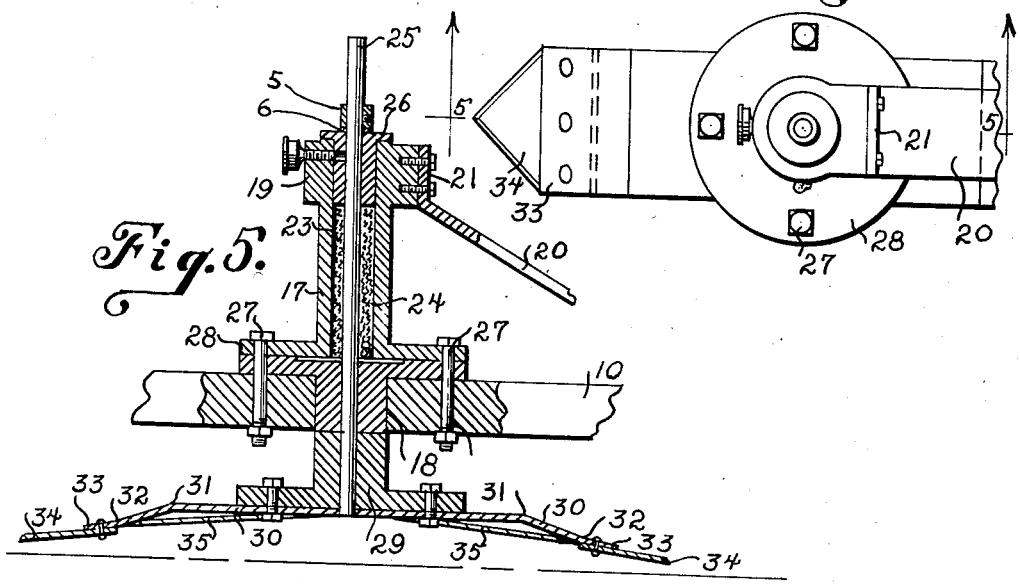
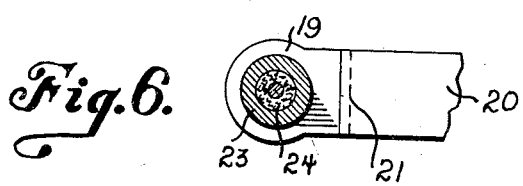
INVENTOR.
Ralph L. Travis
BY Victor J. Evans & Co.
ATTORNEYS Patented May 22, 1951

2,553,731

UNITED STATES PATENT OFFICE 2,553,731

POWER MOWER

Ralph L. Travis, Spirit Lake, Iowa

Application May 8, 1946, Serial No. 668,136

1 Claim. (Cl. 56—25.4)

The invention relates to a power mower, and more especially to a wheeled motor driven grass and weed cutter.

The primary object of the invention is the provision of a mower of this character, wherein the cutter blades rotate in a horizontal path and are motor driven, all being supported by a wheeled carriage, which is under manual draft, and by the use thereof grass and weeds can be cut with ease and dispatch, thus enabling the cutting of a lawn and the trimming of its edges, as well as close to hedges, plants, trees or the like.

Another object of the invention is the provision of a mower of this character, wherein the cutters, each is formed with a double cutting edge, so that in the sweep in reverse directions the cutting operation can be carried forth, the cutters being operated through belt and pulley connections to a power motor of the electric or internal combustion type.

A further object of the invention is the provision of a mower of this character, which is simple in construction thoroughly reliable and efficient in operation, strong, durable, readily and easily handled, it being manually propelled, and of vehicular type, possessed of few parts, which are readily accessible for repairs or replacements, wide range cutting sweep, and inexpensive to manufacture.

With these and other objects in view the invention consists in the features of construction, combination and arrangements of parts as will be hereinafter more fully described, illustrated in the accompanying drawings, which disclose the preferred embodiment of the invention and pointed out in the claim hereunto appended.

In the accompanying drawings:

Figure 3 is a fragmentary vertical longitudinal elevational view on an enlarged scale with parts broken away and parts in section.

Figure 4 is a sectional view on an enlarged scale taken on the line 3—3 of Figure 1 and on line 4—4 of Figure 3 looking in the direction of the arrows.

Figure 5 is a sectional view on an enlarged scale taken on the line 5—5 of Figure 4 looking in the direction of the arrows.

Figure 6 is a sectional view on an enlarged scale taken on the line 6—6 of Figure 3 looking in the direction of the arrows.

Similar reference characters indicate corresponding parts throughout the several views in the drawings.

Figure 1:
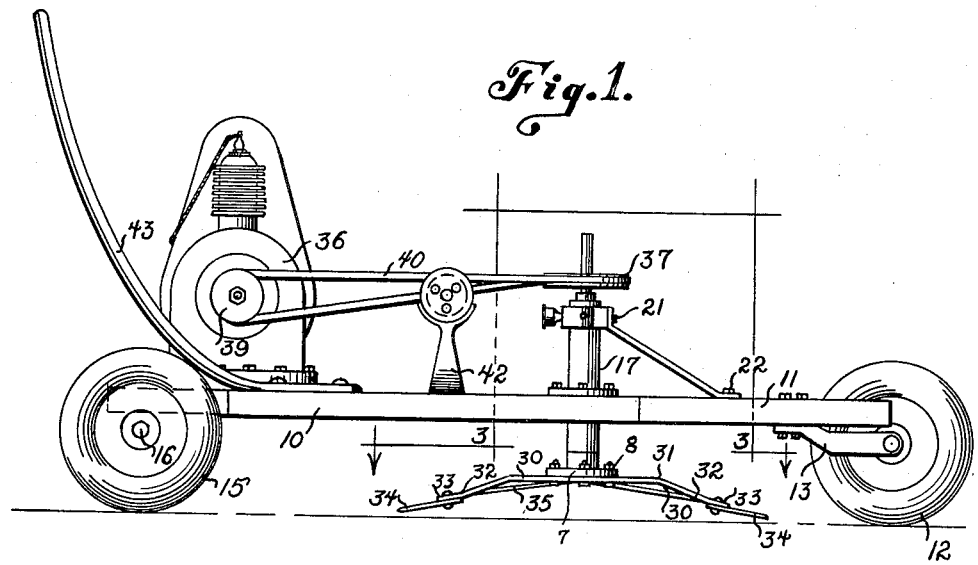
Figure 1 is a side elevation of the mower constructed in accordance with the invention.
Figure 2:
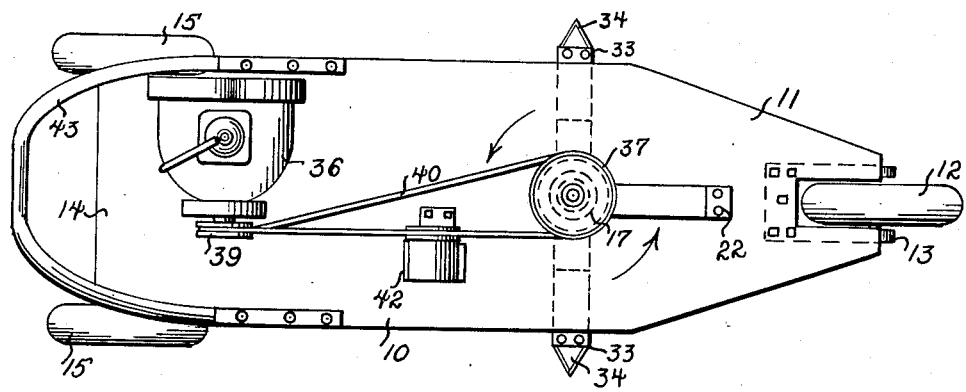
Figure 2 is a top plan view thereof.

Referring to the drawings in detail, the mower constituting the present invention, comprises a wheeled vehicle including an elongated flat platform or body 10, having an outwardly tapered forked front end 11, for a front traction wheel 12, its forked hanger 13 being secured to the under face of the body to vertically register with the forked end 11, as best seen in Figures 1 and 2, while at the rear end 14 of this body are inset rear wheels 15, its axle being indicated at 16 and supported by the said body.

Intermediate of the body 10 at its longitudinal center is a vertically disposed stationary tubular post 17 which is positioned on a flanged bearing section 18 and extends above the platform with an enlarged upper end 19, to which is attached a brace 20, which extends from the platform. The brace having an extended end 25 by which it is attached to the post and also an extended lower end by which it is attached to the platform by the bolts 22. This post 17 is provided with a reservoir 23 for an oil packing 24, about a vertical shaft 25, centered within the post by a bearing or plug 26 removably fitted in the upper end of the post, the post 17 being made fast to the body 10 by bolts 27 engaging in flanges 28 integral with the sections of the said post. The shaft is adjustably held upward by a set collar 5 and a fibre washer 6 is provided under the collar.

The shaft 25 extends through the platform 10, where it has mounted thereon a hub 29 for a pair of oppositely positioned arms 30, formed with a flat strip or plate providing an intermediate section and each of said arms having inner and outer spaced bends 31 and 32, respectively therein, the outer bends providing a sloping section 33 of such arms, while from the inner bends 31 the arms slope downwardly. The arms 30 are attached to a flange 7 on the lower end of the hub 29 by bolts 8. On the sections 33 are riveted or otherwise secured outwardly tapered double knife edge V-shape cutting blades or knives 34. The knives or blades 34 have a slight downward slope outwardly from the sections 33 of the arms 30, as disclosed in Figures 1, 3, and 5 of the drawings, and are braced by the extensions or braces 35 extending substantially throughout the length of the said arms.

On the body 10 toward the aft portion thereof is located, in this instance, an internal combustion motor or engine 36, which may also be an electric motor, in substitute and on the shaft 25 above the post 17 is fixed a pulley 37, while on the power shaft 38 of the motor or engine 36 is a pulley 39, these pulleys having trained thereover an endless power transmission belt 40, for the driving of the cutters, the belt being engaged by a guide pulley 41 bracketed at 42 on the body 10 of the mower.

The body 10 at the rear thereof carries a handle bar 43, so that the mower can be pushed or pulled by hand and guided in its travel. The post 17 at its upper end is fitted with a lubricant cup 44, so that oil can be delivered to the packing within this post.

When the shaft 25 is rotated, the cutters have a circular sweep so that grass, weeds or other like growth can be cut under power operation of the motor.

What is claimed is:

In a whirling blade grass cutter, the combination which comprises a horizontally disposed platform mounted on wheels, a vertically disposed bearing having a flange on the lower end mounted on the said platform, a vertically positioned shaft journaled in the said bearing and extended downwardly below the platform, a motor positioned on the platform, means operatively connecting the motor to the upper end of the shaft, a hub having a horizontally disposed flange on the lower end carried by the lower end of the shaft, elongated plates providing a cutter support positioned against the lower surface of the flange of the hub with the ends of the plate extended from opposite sides of the flange providing knife carrying arms, means removably attaching the said elongated plate to the flange, V-shape double edge knives mounted on the extended ends of the arms, the intermediate portion of said elongated plate being horizontally positioned with the ends inclined downwardly from points spaced from the periphery of the flange to which the plate is attached and with the tips of the downwardly inclined sections extended outwardly at a lesser angle whereby double bends are provided in each arm of the said plate, and diagonally positioned braces attached to the under surface of the plate and extended substantially throughout the length thereof providing reinforcing means rigidly supporting the knives from the flange.

RALPH L. TRAVIS.

REFERENCES CITED

The following references are of record in the file of this patent:

UNITED STATES PATENTS

| Number | Name | Date |
|---|---|---|
| 2,143,057 | Danielson | Jan. 10, 1939 |
| 2,203,198 | Junge | June 4, 1940 |
| 2,210,217 | Ralm | Aug. 6, 1940 |
| 2,232,671 | Loder | Feb. 18, 1941 |